(12) United States Patent
Chugh et al.

(10) Patent No.: US 9,810,067 B2
(45) Date of Patent: Nov. 7, 2017

(54) SPRAY SYSTEM FOR DUST CONTROL ON A MINING MACHINE

(71) Applicants: Yoginder P. Chugh, Murphysboro, IL (US); Harrold G. Gurley, Carterville, IL (US); John W. Pulliam, Benton, IL (US)

(72) Inventors: Yoginder P. Chugh, Murphysboro, IL (US); Harrold G. Gurley, Carterville, IL (US); John W. Pulliam, Benton, IL (US)

(73) Assignee: Board of Trustees of Southern Illinois University, Carbondale, IL (US)

( * ) Notice: Subject to any disclaimer, the term of this patent is extended or adjusted under 35 U.S.C. 154(b) by 46 days.

(21) Appl. No.: 14/926,155

(22) Filed: Oct. 29, 2015

(65) Prior Publication Data

US 2017/0122106 A1    May 4, 2017

(51) Int. Cl.
*E21F 5/02* (2006.01)
*B01D 47/06* (2006.01)
(Continued)

(52) U.S. Cl.
CPC ............... *E21F 5/02* (2013.01); *B01D 47/06* (2013.01); *B05B 7/0425* (2013.01);
(Continued)

(58) Field of Classification Search
CPC ......... E21F 5/02; B01D 47/06; B05B 7/0425; B05B 7/0884; E21C 27/02
(Continued)

(56) References Cited

U.S. PATENT DOCUMENTS 3,325,973 A * 6/1967 Illingworth ............ B01D 46/10
95/154
3,700,284 A * 10/1972 Agnew ................... E21C 35/22
299/12

(Continued)

OTHER PUBLICATIONS

Rider J et al. Controlling Respirable Dust on a Longwall Mining Operations. MSHA-CDC/NIOSH, Slide presentation.
(Continued)

*Primary Examiner* — Chee-Chong Lee
(74) *Attorney, Agent, or Firm* — Robert Patino; Michelle Chitambar (57) ABSTRACT

A spray system for dust control on a shearer machine that operates laterally with respect to a mining floor surface is provided where the spray system is provided with a set of first ranging arm sprays mounted on a first ranging arm and wherein said first ranging arm is located on a first end of a shearer machine chassis. A set of second ranging arm sprays is optionally provided and is mounted on the upper side of the first ranging arm and resides approximate to and in operational relationship to the set of first ranging arm sprays. Furthermore, a plurality of chassis spray sets may also be optionally provided and are located on a mining side of said shearer machine chassis and reside in a non-linear format. Moreover, a set of shearer-clearer venturi arm sprays may also optionally be provided and is mounted on a shearer-clearer venturi arm that resides as an angular extension of the set of first shearer-clearer arm sprays.

8 Claims, 6 Drawing Sheets

(51) Int. Cl.
*E21C 35/23* (2006.01)
*E21C 27/02* (2006.01)
*B05B 7/08* (2006.01)
*B05B 7/04* (2006.01)
*E21C 25/10* (2006.01)

(52) U.S. Cl.
CPC ............ *B05B 7/0884* (2013.01); *E21C 27/02* (2013.01); *E21C 35/23* (2013.01); *B01D 2259/45* (2013.01); *E21C 25/10* (2013.01)

(58) Field of Classification Search
USPC .......................................... 239/159; 299/81.2
See application file for complete search history.

(56) References Cited

U.S. PATENT DOCUMENTS

| | | | | |
|---|---|---|---|---|
| 3,757,491 A | * | 9/1973 | Gourdine | B03C 3/16 239/3 |
| 4,315,658 A | * | 2/1982 | French | E21C 35/223 299/12 |
| 4,351,567 A | | 9/1982 | Gillingham | |
| 4,380,353 A | * | 4/1983 | Campbell | B01D 47/06 299/12 |
| 4,394,053 A | | 7/1983 | Schupphaus | |
| 4,483,238 A | | 11/1984 | Thakur | |
| 4,487,615 A | * | 12/1984 | Taylor | B01D 47/06 252/88.1 |
| 5,219,208 A | | 6/1993 | Liao et al. | |
| 5,265,941 A | * | 11/1993 | Marteney | E21C 41/16 299/12 |
| 5,518,299 A | | 5/1996 | Adamczyk | |
| 6,132,497 A | | 10/2000 | Conklin | |
| 7,954,904 B2 | | 6/2011 | Mundry et al. | |

OTHER PUBLICATIONS

Kissel, F. 2003. Handbook for Dust Control in Mining. NIOSH, Information Circulation (IC 9465).

Jayaraman N. et al. 1984. Modify Spray Heads to Reduce Dust Rollback on Miners. Coal Age, 89(6): 56-57.

Courtney W et al. 1977. Control of Respirable Dust by Improved Water Sprays. In: Respirable Dust Control—Proceedings: Bureau of Mines Technology.

(cont'd.) Transfer Seminars, Pittsburgh, PA, Sep. 21, 1976 and St. Louis, MO, Sep. 23, 1976. Information Circular (IC 8753), pp. 92-108.

* cited by examiner

SPRAY SYSTEM FOR DUST CONTROL ON A MINING MACHINE

BACKGROUND OF THE INVENTION

Longwall mining of coal has increased substantially in the United States and currently accounts for over 50% of the underground mined coal. Increased production rates and high out-of-coal seam dilution (over 25%) in the United States and around the globe continue to generate dust control problems in mining areas. After a significant decrease in the number of incidents of coal worker's pneumoconiosis (CWP) over the last several decades, the number of reported cases in this decade is increasing. The primary cause of CWP is inhalation of respirable dust in a confined workplace; specifically, the inhalation of coal and quartz dust in a mine. The National Institute for Occupational Safety and Health (NIOSH) recognizes this disease as being severely disabling, potentially lethal, and entirely preventable through respirable (less than 10 micron) dust control. The typical protocol for prevention of this disease has been monitoring mine workers for symptoms of this disease and, once a CWP diagnosis has been made, moving the miner to a low-dust exposure job. Prevention of this disease through a significant reduction in mine workers' exposure to respirable dust is a high priority. Additionally, several mines face reduced dust standards due to high respirable quartz content in the dust.

In longwall coal mines, longwall shearers account for about 50% of the generated dust. Other important sources of dust include longwall supports, armored face conveyor, and stage loader. The shearer operators (SOs), roof support operators (ROs), and maintenance workers are likely to be overexposed to respirable dust. Dust control is a very important research problem in the USA and around the globe to meet the current US regulatory coal dust exposure requirement of 2 $mg/m^3$ averaged over an 8-hour period. This problem has become even more critical with the implementation of new dust control regulations effective Aug. 1, 2014. The new regulations will now require meeting the new coal dust and quartz exposure requirements of 1.5 $mg/m^3$ and 75 micro-gram/$m^3$ averaged over the entire working shift effective Aug. 1, 2016. The working shift may be 8 hours but is not limited to this period. The working shift is up to the mine operator and may be between 4 hours and 16 hours. It is unanimously accepted among the professionals that meeting these requirements around the face area in longwall coal mines will be an extreme challenge.

Current technologies to control dust around shearer generally include water sprays behind each of the cutting bits on the two shearer drums and water sprays around the shearer drum. Optionally, crescent sprays may be provided at the end of the ranging arm and at the end of a shearer-clearer arm (SC) located about five (5) feet away and about parallel with the ranging arm. Chassis sprays that reside in a linear manner can also be provided and are located along the length of the chassis and directed at the freshly-mined face between the two shearer drums. The water volume used for sprays around each drum is about 30 gpm, with additional about 12 gpm for chassis sprays for total water volume of about 75 gpm. The peak production rate for a typical shearer is about 40 tons per minute for Illinois basin longwall faces, with about 65% of coal produced from the lead drum (or first drum) and 35% produced from the tail drum (or second drum). Another major problem facing longwall dust control is low residence time for dust to be wetted with water-based fluids (less than 5 sec) due to high air velocity (typically 400 ft./min to 1,000 ft./min) on longwall faces as compared to only about 100-200 ft./min for room-and-pillar coal mining. NIOSH research-based recommended locations and intuitively designed water sprays in the areas indicated above are being extensively used to control dust for the two shearer operators (SO) in the walkway, roof support operators (RO), and other operations support personnel in the face area. Based on an extensive review of pertinent literature and discussion with mine operators, there is no consensus on the type and location of sprays, volume of water and water pressure to be used in sprays. Although general guidelines have been developed by NIOSH researchers based on laboratory and field studies (see Controlling Respirable Dust on a Longwall Mining Operations, MSHA-CDC/NIOSH, Jim Rider, Jay Colinet—Slide presentation), mine operators tend to use their own intuitive thinking in using the spray system to suit their conditions.

Studies over the last several decades have attempted to identify sources of dust and solutions to the dust problems in mining environments. The conventional wisdom was presented by Chang and Zukovich (Cheng L and Zukovich P. P. 1973. Respirable dust adhering to run-of-face bituminous coals. Pittsburgh, Pa.: U.S. Department of the Interior, Bureau of Mines, RI 7765. NTIS No. PB 221-883.) They stated that a large amount of dust created does not become airborne and stays attached to the broken material. Therefore, spraying more water on the broken material tends to reduce dust. Adding water directly at the cutting picks that gets mixed with fragmented coal is more important than creating a shroud of water around the miner or shearer. Based on these observations, the conventional practice of mixing the water uniformly with broken coal was developed. This approach has been effective for coarser dust that are larger particles than airborne dust (I.e. larger than 10 microns). This approach is deficient for airborne dust because it blows the smaller particles into the environment.

Additional studies have observed that water can be used to control dust through the wetting of broken material and capture of airborne dust. (Kissel, F., "Handbook for Dust Control in Mining", NIOSH, Information Circulation (IC 9465), 2003, pp. 131.) Although the methods of wetting broken material have been more uniform throughout the industry, unscientific approaches have been taken to the capture of airborne dust through the use of water sprays. This is most likely due to the problem and sometimes conflicting proposed solutions. It is suggested that a large number of smaller-volume sprays is better for dust control than smaller number of larger-volume sprays. U.S. Bureau of Mines concluded that many spray systems can create turbulent airflow in the face area that can result in rollback of dust. (Jayaraman, N, Fred N. Kissel, and W. E. Schroder (1984), "Modify Spray Heads to Reduce Dust Rollback on Miners," Coal Age, June 1984).

Some research has proved valuable in the design of water spray systems. Courtney and Cheng concluded that typical water sprays operating at 100 psi do not capture more than 30% airborne dust in an open environment. (Courtney W. G. & Cheng L. 1977. Control of respirable dust by improved water sprays. In: Respirable Dust Control—Proceedings of Technology Transfer Seminars, Pittsburgh, Pa., and St. Louis, Mo., IC 8753, pp. 92-108. NTIS No. PB 272 910.) Furthermore, inappropriately designed sprays can displace dust clouds rather than wet or capture airborne dust. Reducing the water droplet size through the use of atomizing or fagging sprays may temporarily improve the airborne dust capture efficiency. However, small droplets tend to collapse/ evaporate easily and release the captured dust. (McCoy J., Melcher J., Valentine J., Monaghan D., Muldoon T. & Kelly J. 1983. Evaluation of charged water sprays for dust control. Waltham, Mass.: Foster-Miller, Inc. U.S. Bureau of Mines Contract No. H0212012. NTIS No. PB83-210476.) Atomizing nozzles are most efficient in airborne dust capture followed by hollow cone, full cone, and flat sprays. Atomizing sprays can however get clogged frequently that can negatively affect equipment downtime and productivity. Hollow cone sprays are less likely to clog due to larger orifice area.

Nozzles operating at higher pressures are likely more efficient in the use of water while providing similar airborne dust capture efficiency. However, high-pressure sprays tend to disperse more dust and can create recirculation zones due to pressure differences. Therefore, their use is more appropriate in a relatively confined environment and does not work as effectively when there is air circulated in the mining area at high velocities.

In spite of considerable research done by the U.S. Bureau of mines (USBM), the National Institute of Occupational Safety and Health (NIOSH), and the industry over the last 40 years, there are significant limitations to the current practices. There is a need to improve the design concepts of sprays on and around the longwall shearer to control respirable dust (including quartz dust) exposure of workers around the mining face area.

One of the observable deficiencies in the present design includes poorly positioned sprays. For example, when the lead shearer drum is cutting near the top of the coal seam against the airflow, some sprays behind the cutting bits (adjacent to the face of the mine) tend to force and disperse dust toward an open area. This dust is entrained in the intake air traveling toward the drum and some of it travels toward the location of SOs and ROs and other personnel in the walkway in the face area. Furthermore, when the intake air traveling toward the tailgate intercepts the end of the shearer machine chassis, the air tends to rise due to upward pressure resulting from interaction with the armored face conveyor or AFC (traveling toward the stage loader). Some of the entrained dust travels to SOs and ROs located in the walkway in the face area.

The number of sprays mounted on the shearer-clearer (SC) arm is small and not located properly to provide effective hydraulic curtains to divide the air into fresh air stream and contaminated air stream. Furthermore, the length of the SC arm is not long enough to prevent dust-entrained air from reaching SOs and ROs.

The spacing between sprays on the chassis, and on the SC arm is generally small (3-5 inches). Therefore, there is considerable interaction between two adjacent sprays. These interactions (caused by different sprays hitting each other) results in water droplet size increase after interaction. Since the ability to capture dust requires that the water droplet size be near the size of the dust particle, this interaction significantly reduces the potential to wet the finer fractions of dust. Furthermore, most of the spray energy is dissipated in interactions rather than wetting the dust.

Another example of a deficiency is the use of improper pressures for several of the sprays. For example, several mines utilize high pressure sprays (150 psi and over) around the shearer drum. These sprays displace and disperse dust into the open space adjacent to the shearer drum. This dust is entrained in the incoming intake air and some of it can travel toward the SOs and ROs.

As such, there is a need to cure these deficiencies and maintain a relatively similar use of water consumption as the presently used designs. There is also a need to minimize the dust exposure by SOs and ROs in a longwall mining operation to levels below what are presently experienced. Furthermore, the required solution must negligibly impact the present coal extraction process that has been optimized for efficiently mining and extracting coal.

BRIEF SUMMARY OF THE INVENTION

The above mentioned needs are solved by the present invention. Several concepts were developed and implemented in the present invention for improving the dust control using hydraulic sprays on longwall shearers. These concepts include in combination or in parts utilizing several approaches that include: 1) Improving wetting of generated dust at the source, 2) Minimizing escape of the dust from the generation areas toward the areas where intake air can entrain it and travel toward the mine worker locations; 3) Providing mine worker locations a relatively un-contaminated air stream; 4) Creating hydraulic curtains to create barriers to airflow and to modify air circulation patterns so that mine workers are not exposed to high concentration dust-laden air. As such, various embodiments are presented that improve the dust control with a modified spray system from what has been traditionally employed.

In a first embodiment, a spray system for dust control on a shearer machine that operates relative to a mining floor surface is provided with a set of first ranging arm sprays mounted on a first ranging arm, wherein the first ranging arm is located on a first end of a shearer machine chassis. To complement the set of first ranging arm sprays, a set of second ranging arm sprays is mounted on an upper side of said first ranging arm, wherein the second set of ranging arm sprays reside approximate to and in operational relationship to the set of first ranging arm sprays. Furthermore, each individual spray nozzle of the set of second ranging arm sprays correspond with an individual spray nozzle of the set of first ranging arm sprays.

In a second optional embodiment, a spray system for dust control on a shearer machine is provided that operates laterally with respect to a mining floor surface and comprises a set of first ranging arm sprays mounted on a first ranging arm, wherein the first ranging arm is located on a first end of a shearer machine chassis. A set of first tail ranging arm sprays mounted on a tail ranging arm is also provided, wherein the first tail ranging arm is located on a second end of the shearer machine chassis. Furthermore, a plurality of chassis spray sets is also provided and is located on a mining side of the shearer machine chassis, wherein the chassis spray set comprises a plurality of chassis spray nozzles that reside in a non-linear format.

In a third optional embodiment, a spray system for dust control on a shearer machine that operates laterally with respect to a mining floor surface is provided with a set of first ranging arm sprays mounted on a first ranging arm, wherein the first ranging arm is located on a first end of a shearer machine chassis. A set of first shearer-clearer arm sprays mounted on a first shearer-clearer arm is also provided, wherein the first shearer-clearer arm is located on the first end of the shearer machine chassis. A set of shearer-clearer venturi arm sprays is mounted on a shearer-clearer venturi arm and resides in operational relationship to the set of first shearer-clearer arm sprays and is situated as an angular extension of the set of first shearer-clearer arm sprays.

In a fourth optional embodiment, a spray system for dust control on a shearer machine that operates laterally with respect to a mining floor surface is provided with a set of first ranging arm sprays mounted on a first ranging arm, wherein the first ranging arm is located on a first end of a shearer machine chassis. A set of second ranging arm sprays is mounted on the first and resides approximate to and in operational relationship to the set of first ranging arm sprays. And a set of ranging arm extension sprays is provided that reside on a ranging arm extension located 2 to 18 inches further away from a far end of the first ranging arm.

DETAILED DESCRIPTION

Figure 1A:
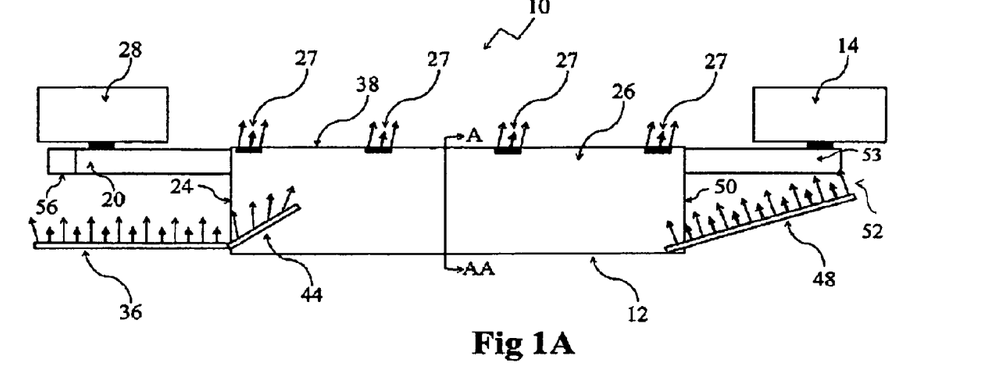
FIG. 1A is a top planar view of a first embodiment of the invention illustrating a shearer-clearer venturi arm in operational relationship to the set of first shearer-clearer arm sprays.
Figure 1B:
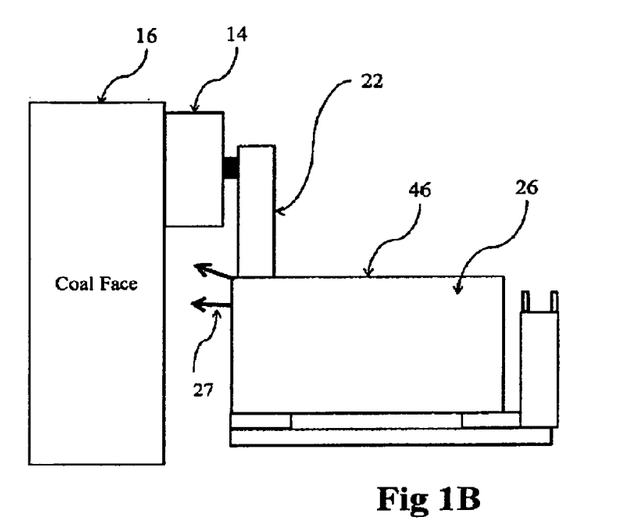
FIG. 1B is a cross-sectional view of FIG. 1A illustrating a shearing drum on a coal face and the direction of the sprays related to a plurality of chassis spray sets.

A spray system 10 is generally provided and is designed for controlling dust as shown in FIGS. 1A and 1B. When a shearer machine 12 is in operation, an at least one drum 14 generates dust when a mining wall 16 is scraped. The shearer machine 12 generally operates laterally relative to a mining floor surface to shear material from the mining wall 16 by using a conveyor system.

Figure 1C:
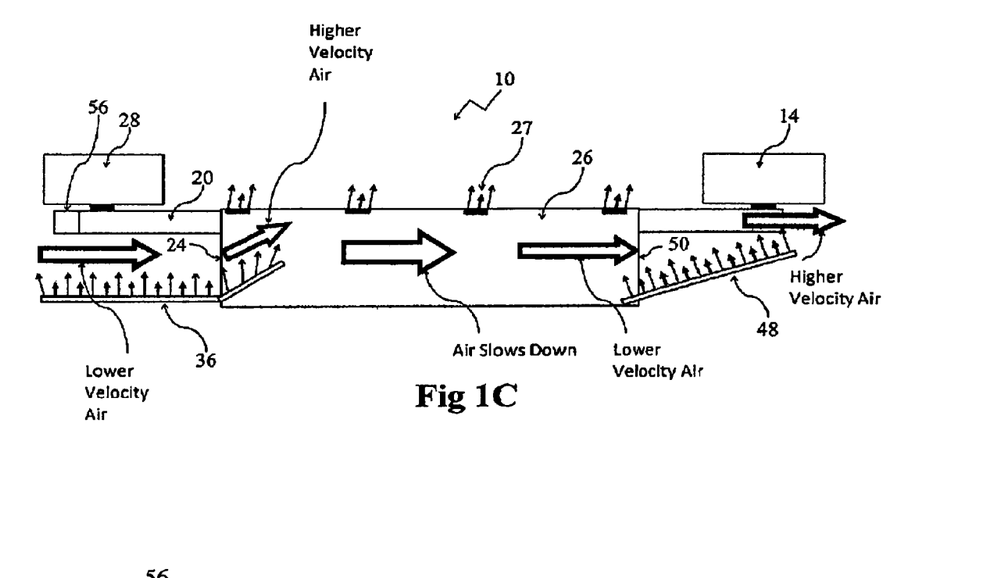
FIG. 1C is a top planar view of the first embodiment shown in FIG. 1A and the direction of air flow as it relates to the spray system.
Figure 3A:
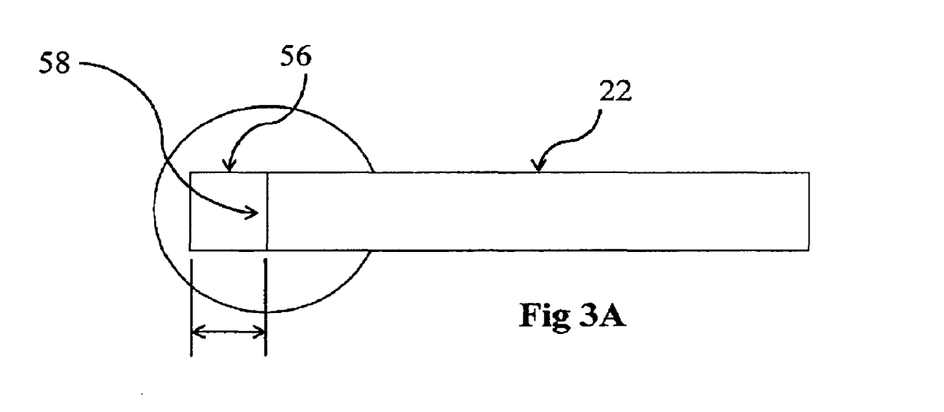
FIG. 3A is a rear planar view of a first ranging arm and a ghosted view of a ranging arm extension.
Figure 3B:
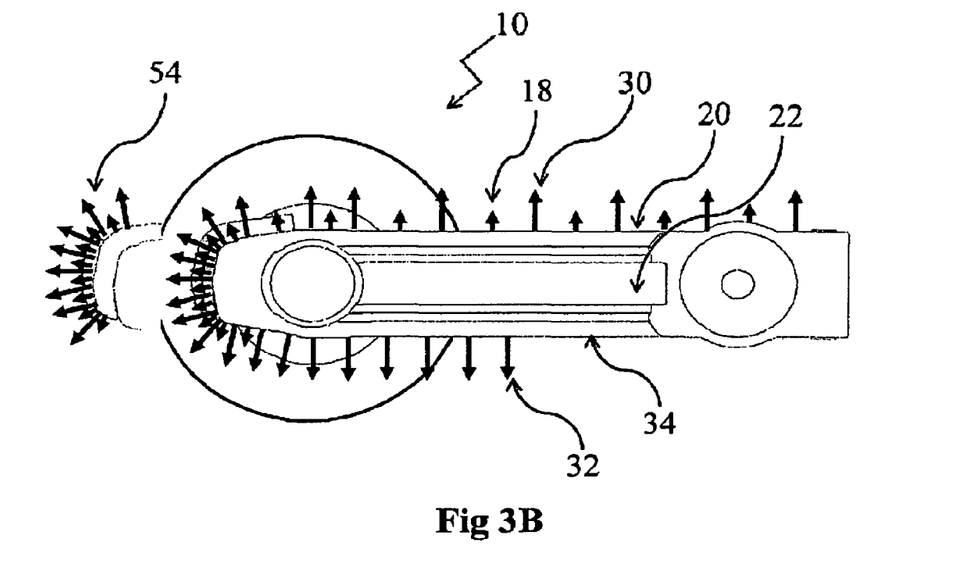
FIG. 3B is a rear planar view of the first ranging arm and a represented spray direction of the set of first ranging arm sprays and a set of ranging arm extension sprays that reside on the ranging arm extension.
Figure 3C:
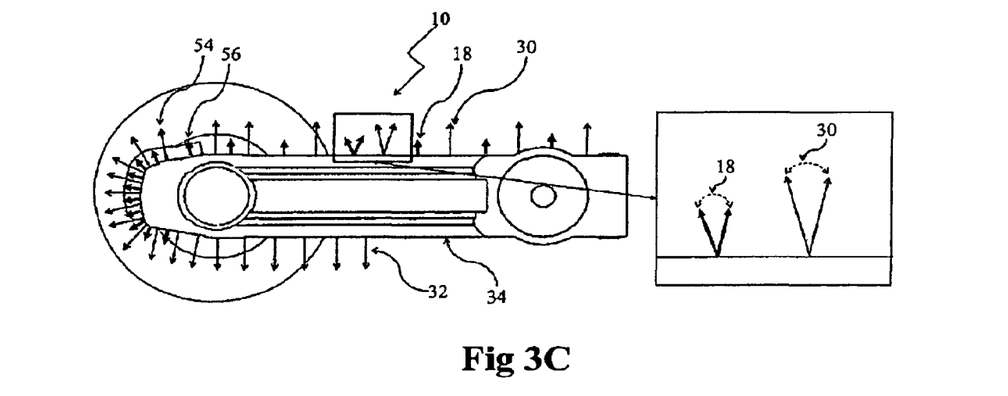
FIG. 3C is a rear planar view of the first ranging arm and a top planar view of a represented spray direction of the set of first ranging arm sprays and the set of second ranging arm sprays.
Figure 4A:
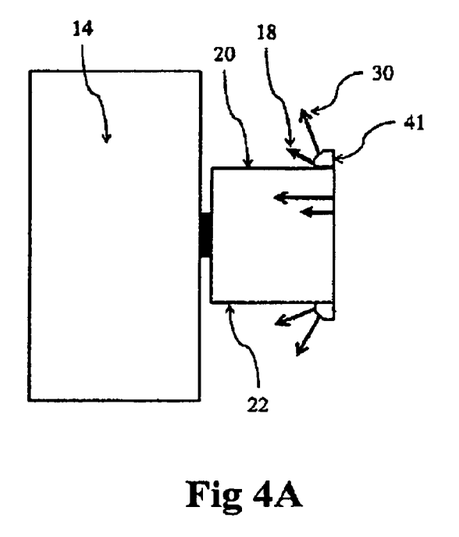
FIG. 4A is a side planar view of a head drum and the first ranging arm set with the first ranging arm sprays and a corresponding set of second ranging arm sprays.
Figure 4B:
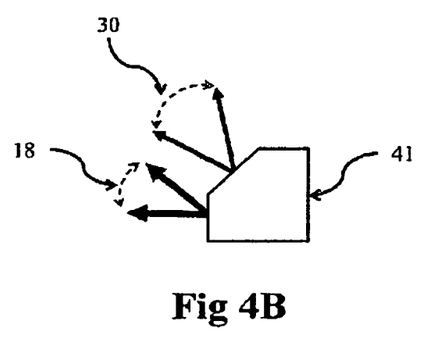
FIG. 4B is a side planar view of the first ranging arm sprays and the corresponding set of second ranging arm sprays.

Referring now to FIGS. 1A, 1C, 3B, 3C, 4A and 4B, the spray system 10 is provided with a set of first ranging arm sprays 18 mounted on an upper side 20 of a first ranging arm 22. The first ranging arm 22 is located on a first end 24 of a shearer machine chassis 26 and extends several feet to support a lead drum 28 (or first drum). The lead drum 28 refers to the drum that resides on the side where air enters the operating area as shown in FIG. 1C but it is known in the art that the shearer machine 12 will operate in a reverse manner where the lead drum 28 trails the shearer machine chassis 26. The set of first ranging arm sprays 18 are directed at an angle as shown in 4A and 4B to target the approximate circumference of the lead drum 28. An operator may desire to adjust the angle of the individual spray nozzles of the set of first ranging arm sprays 18. To accommodate the adjustment, the individual spray nozzles of the set of first ranging arm sprays 18 may be moveable between 0 degrees and 45 degrees relative to the mining floor surface as shown in FIG. 4B. The spacing between individual spray nozzles within the set of first ranging arm sprays is between four and eighteen inches.

A set of second ranging arm sprays 30 is optionally provided and is mounted on the upper side 20 of the first ranging arm 22. The second set of ranging arm sprays 30 reside approximate to and in operational relationship to the set of first ranging arm sprays 18. In a preferred embodiment, the individual spray nozzles of the set of second ranging arm sprays 30 reside between 1 and 5 inches behind the individual spray nozzles of the set of first ranging arm sprays 18 as shown in FIG. 4B. The spacing between individual spray nozzles within the set of second ranging arm sprays 30 is between four and eighteen inches. In a preferred embodiment, the individual spray nozzles of the set of second ranging arm sprays 30 reside in between the individual spray nozzles of the set of first ranging arm sprays 18 as shown in FIG. 3C where the small arrows illustrate the individual spray nozzles of the set of first ranging arm sprays 18 and the longer arrows illustrate the individual spray nozzles of the set of second ranging arm sprays 30. In this manner, a spray curtain is created to fill in the gaps created by the set of first ranging arm sprays 18. In one embodiment, the individual spray nozzles of the set of first ranging arm sprays 18 are set at 6 inch intervals and the individual spray nozzles of the set of second ranging arm sprays 30 are set at 6 inch intervals and the set of first ranging arm sprays 18 are set in a manner relative to the set of second ranging arm sprays 30 so that the individual spray nozzles are situated in 3 inch intervals in a linear direction relative to the first ranging arm 22. However, it is also noted that the individual spray nozzles of the set of second ranging arm sprays 30 may reside directly behind or nearly directly behind the individual spray nozzles of the set of first ranging arm sprays 18. The individual spray nozzles of the second ranging arm sprays 30 are preferably directly to the ceiling of the mining operation just above and slightly behind the lead drum. To make the aim more precise, the individual spray nozzles of the second ranging arm sprays 30 are moveable from an angle between 15 and 75 degrees relative to the mining floor surface as shown in FIG. 4B.

Now referring to FIGS. 3B and 3C, a lower set of first ranging arm sprays 32 is optionally provided and is mounted on a lower side 34 of the first ranging arm 22. The lower set of first ranging arm sprays 32 assists in ensuring that a majority of the dust from the mining operation stays trapped between the first ranging arm 22 and the mining wall 16 as a liquid curtain is completed from the ceiling to the floor of the mine. The angle for the individual spray nozzles of the lower set of first ranging arm sprays 32 are preferably directed toward a ground surface just below the lead drum 14.

Figure 5A:
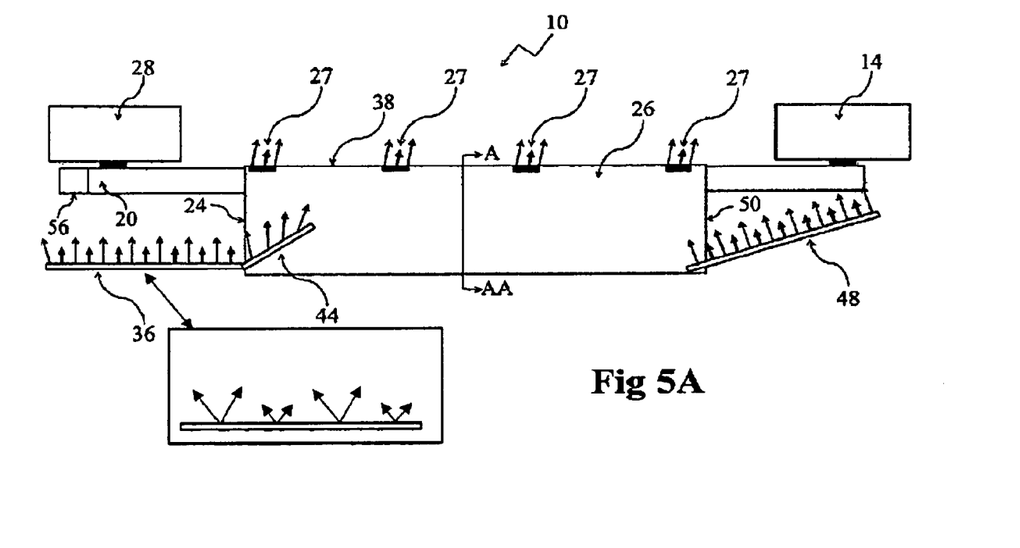
FIG. 5A is a top planar view of a ghosted view of a ranging arm extension and a set of first shearer-clearer arm sprays mounted on a first shearer-clearer arm with a corresponding shearer-clearer venturi arm.

Now referring to FIGS. 1A, 1C and 5A, a set of shearer clearer arm sprays 36 is optionally provided and resides approximate to and behind the set of first ranging arm sprays 18. The set of shearer clearer arm sprays 36 is located on the first end 24 of a shearer machine chassis 26 and extends several feet. Preferably, the set of shearer clearer arm sprays 36 resides 2 to 8 feet further away from a mining side 38 of the shearer machine chassis 26. The set of shearer clearer arm sprays 36 acts as a second curtain to complement the set of first ranging arm sprays 18. The set of shearer clearer arm sprays 36 keeps the vast majority of residual dust that has gotten behind the first ranging arm 22 from getting to the operator or operators that work on an operator side 40 of the shearer machine chassis 26.

The operators may wish to adjust the set of first ranging arm sprays 18 and the set of second ranging arm sprays 30 to correspond more effectively with the set of shearer clearer arm sprays 36 and the lead drum 28. As such, it is desirable that the set of first ranging arm sprays 18 and the set of second ranging arm sprays 30 are moveable between the mining side 38 of the first ranging arm 22 to the operator side 40 of the first ranging arm 22. To accommodate this movement, the individual nozzles on the set of first ranging arm sprays 18 and the individual nozzles on the set of second ranging arm sprays 30 are connected by a flexible hose or solid tube. A mounting platform 41 may optionally be used to mount the set of first ranging arm sprays 18 and the set of second ranging arm sprays 30. The mounting platform 41 can easily be adjusted on the first ranging arm 22 by repositioning the mounting platform 41 to correspond to the desired distance from the mining wall 16 or lead drum 28.

Figure 5B:
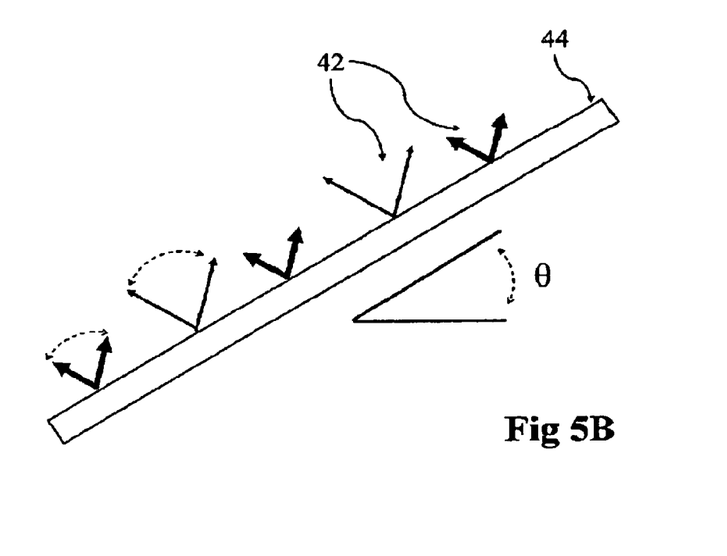
FIG. 5B is a top planar view of a set of shearer-clearer venturi arm sprays mounted on the shearer-clearer venturi arm.

Now referring to FIGS. 5A and 5B, in an optional embodiment, a set of shearer-clearer venturi arm sprays 42 is mounted on a shearer-clearer venturi arm 44 located on a top surface 46 of the shearer machine chassis 26. The set of shearer-clearer venturi arm sprays 42 resides approximate to and at an angle θ to the set of shearer clearer arm sprays 36. The set of shearer-clearer venturi arm sprays 42 is moveable between an angle greater than 105 degrees and less than 180 degrees from the set of shearer-clearer arm sprays 42 where θ would be between 0 and 75 degrees. The individual spray nozzles of the set of shearer-clearer venturi arm sprays 42 should be positioned to generally face either the first ranging arm 22 or the mining wall 16. The preferred spacing between individual spray nozzles within the set of shearer-clearer venturi arm sprays 42 is between 6 to 18 inches, though shorter distances of up to 2 inches could be used.

The set of shearer-clearer venturi arm sprays 42 conditions the air as illustrated in FIG. 1C. The air between the first ranging arm 22 and the shearer clearer arm sprays 36 is compressed to create a higher velocity of air known as a venturi effect. The result of this phenomenon is that air that is free or substantially free of contaminated dust particles is encouraged to flow behind the set of shearer clearer arm sprays 36 and the set of shearer-clearer venturi arm sprays 42 thereby exposing the operator on the operator side 40 to air that is substantially independent of the mining operation.

Now referring to FIGS. 1A and 1C, in an optional embodiment, a trailing set of shearer-clearer venturi arm sprays 48 is positioned on a second end 50 of the shearer machine chassis 26. Part of the trailing set of shearer-clearer venturi arm sprays 48 may reside located on the top surface 46 of the shearer machine chassis 26. The trailing set of shearer-clearer venturi arm sprays 48 may be positioned in a linear or angular manner. The angular manner is preferred and the trailing set of shearer-clearer venturi arm sprays 48 is moveable between an angle of about 0 degrees to an angle of about 75 degrees. A set of first tail ranging arm sprays (not shown) is mounted on a first tail ranging arm 53. The first tail ranging arm 53 is located on the second end 50 of the shearer machine chassis 26 but the first tail ranging arm 53 resides closer to the mining wall 16 than the trailing set of shearer-clearer venturi arms sprays 48 to support a second drum 14. The trailing set of shearer-clearer venturi arm sprays 48 and the set of first tail ranging arm sprays can assist with the venturi effect by creating higher velocity air to escape past a tail end 52 of the shearer machine 12.

Now referring to FIGS. 1A, 3A, 3B, 3C and 4A, in an optional embodiment, a set of ranging arm extension sprays 54 resides on a ranging arm extension 56 that is mounted on a far end 58 of the first ranging arm 22. The ranging arm extension 56 may be a solid plate made of a metal or other durable material that is manufactured to extend beyond the normal length of the first ranging arm 22. The purpose of the set of ranging arm extension sprays 54 is to have the individual spray nozzles closer to the point of contact the lead drum 28 has with the mining wall 16. Shearer machines in the prior art have individual spray nozzles located at the end of the first ranging arm 22 and this design is deficient because ample dust and particles escape the sprays through the front end of the lead drum 28. The desired water curtain in the present invention is more effective when the ranging arm extension 56 is in place to move the set of ranging arm extension sprays 54 forward. In a preferred embodiment, the ranging arm extension 56 should be between 2 and 18 inches long depending on the size of the lead drum 28. As such, the set of ranging arm extension sprays 54 is located 2 to 18 inches further away from the far end 58 of the first ranging arm 22.

Figure 2A:
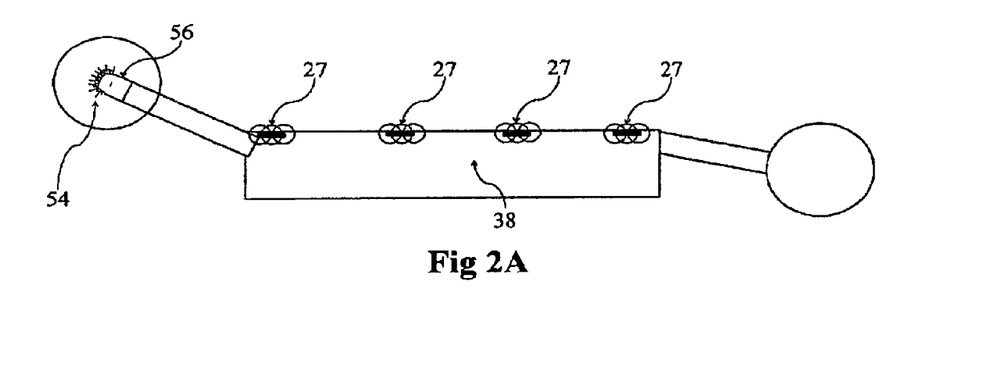
FIG. 2A is a front planar view of an optional embodiment where a plurality of chassis spray sets located on a mining side of a shear chassis comprise individual spray nozzles that reside in a linear format.
Figure 2B:
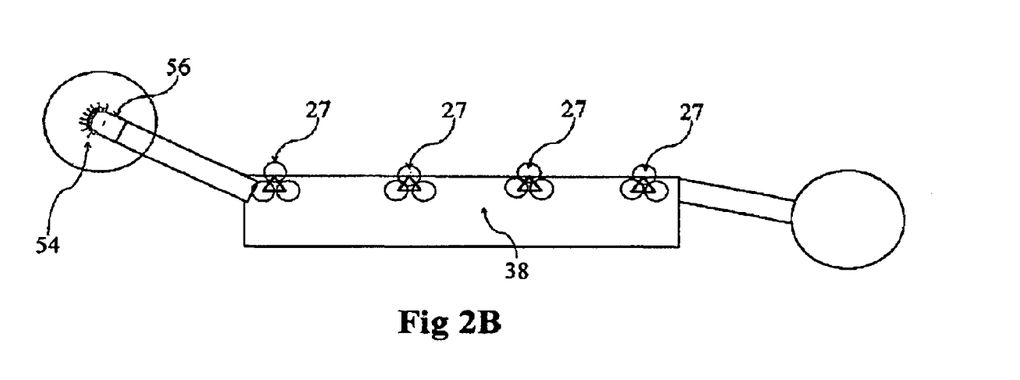
FIG. 2B is a front planar view of an optional embodiment where a plurality of chassis spray sets located on a mining side of a shear chassis comprise individual spray nozzles that reside in a non-linear format.
Figure 2C:
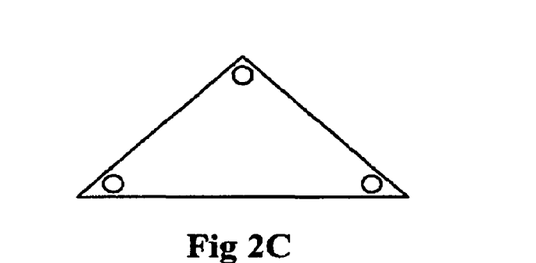
FIG. 2C is a front planar view of the individual spray nozzles of the chassis spray set in a non-linear, triangular format.

Now referring to FIGS. 1A, 1C, 2A, 2B and 2C, in another optional embodiment, a plurality of chassis spray sets 27 is located on the mining side 38 of the shearer machine chassis 26. The plurality of chassis spray sets 27 reside in a substantially linear relationship and said substantially linear relationship is substantially parallel to the mining floor surface. The chassis spray sets 27 preferably comprise of individual spray nozzles that reside in a non-linear format as shown in FIGS. 2B and 2C. The individual spray nozzles reside at least 3 inches apart and may reside up to 36 inches apart for each chassis spray set. In the most preferred embodiment, the non-linear format is that of a triangle as shown in FIG. 2C, but the non-linear format may be squared, circular, trapezoidal, or other non-linear shape. The non-linear format assists in creating a more effective barrier of dust particles between the shearer machine chassis 26 and the mining wall 16 by extending the curtain effect created by the set of first ranging arm sprays18.

While several particular embodiments of the present invention have been described herein, it will be appreciated by those skilled in the art that changes and modifications may be made thereto without departing from the invention in its broader aspects and as set forth in the following claims.

We claim:

1. A spray system for dust control that operates on a mining floor surface to shear material from a mining wall, the spray system comprising:
   a shearer machine comprising a shearer machine chassis, a first ranging arm located on a first end of said shearer machine chassis, and a tail ranging arm located on a second end of said shearer machine chassis,
   a set of first ranging arm sprays and a set of second ranging arm sprays mounted on an upper side of a first ranging arm, wherein said first ranging arm is located on a first end of the shearer machine chassis and said set of first ranging arm sprays are directed at an angle between 0 degrees and 45 degrees relative to the mining floor surface and said set of second ranging arm sprays are directed at an angle between 15 and 75 degrees relative to the mining floor surface, a trailing set of shearer-clearer venturi arm sprays located behind said tail ranging arm and mounted on an operator side of said shearer machine chassis, and a set of shearer clearer arm sprays that operates in conjunction with a set of shearer-clearer venturi arm sprays located towards a first end of said shearer machine chassis, wherein said set of shearer clearer arm sprays are aligned linearly relative to said set of first ranging arm sprays and reside 2 to 8 feet away from said set of first ranging arm sprays relative to a mining side of said shearer machine chassis and wherein said set of shearer-clearer venturi arm sprays are located on a top surface of said shearer machine chassis and reside approximate to and angled between 105 degrees and less than 180 degrees from said set of shearer clearer arm sprays.

2. The spray system of claim 1, wherein a spacing between a plurality of spray nozzles within said set of first ranging arm sprays is between four and eighteen inches.

3. The spray system of claim 1, wherein said spacing between said plurality of spray nozzles within said set of second ranging arm sprays is between four and eighteen inches.

4. The spray system of claim 1, further comprising a plurality of chassis spray sets located on said mining side of said shearer machine chassis, wherein said plurality of chassis spray sets comprise individual spray nozzles that reside in a non-linear format.

5. The spray system of claim 4, wherein said non-linear format is triangular.

6. The spray system of claim 1, wherein said set of first ranging arm sprays is moveable between a mining side of said first ranging arm to an operator side of said first ranging arm.

7. The spray system of claim 1, further comprising a set of ranging arm extension sprays that reside on a ranging arm extension located at a far end of said first ranging arm.

8. The spray system of claim 7, wherein said ranging arm extension places said set of ranging arrn extension sprays 2 to 18 inches further away from said far end of said first ranging arm.

\* \* \* \* \*